United States Patent
Yue et al.

(10) Patent No.: US 9,025,692 B2
(45) Date of Patent: *May 5, 2015

(54) PRECODING SELECTION FOR RETRANSMISSION IN UPLINK MIMO HYBRID ARQ

(71) Applicant: NEC Laboratories America, Inc., Princeton, NJ (US)

(72) Inventors: Guosen Yue, Plainsboro, NJ (US); Narayan Prasad, Wyncote, PA (US); Meilong Jiang, Plainsboro, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,643

(22) Filed: Apr. 8, 2014

(65) Prior Publication Data

US 2014/0219379 A1    Aug. 7, 2014

Related U.S. Application Data

(62) Division of application No. 13/252,650, filed on Oct. 4, 2011, now Pat. No. 8,699,621.

(60) Provisional application No. 61/389,461, filed on Oct. 4, 2010.

(51) Int. Cl.
*H04L 27/00* (2006.01)
*H04B 7/04* (2006.01)
*H04L 25/03* (2006.01)
*H04L 1/18* (2006.01)
*H04L 1/06* (2006.01)

(52) U.S. Cl.
CPC ........... *H04B 7/0456* (2013.01); *H04L 1/0618* (2013.01); *H04L 25/03343* (2013.01); *H04L 2025/03426* (2013.01); *H04L 1/1896* (2013.01)

(58) Field of Classification Search
CPC ..................................................... H04B 7/0456
USPC ......................................................... 375/267
See application file for complete search history.

(56) References Cited

U.S. PATENT DOCUMENTS

| | | | |
|---|---|---|---|
| 7,764,746 B2 * | 7/2010 | Clerckx et al. | 375/267 |
| 7,978,635 B2 * | 7/2011 | Tsai et al. | 370/282 |
| 7,995,671 B2 * | 8/2011 | Kim et al. | 375/267 |
| 8,201,043 B2 * | 6/2012 | Kim et al. | 714/748 |
| 8,285,232 B2 * | 10/2012 | Khojastepour et al. | 455/129 |
| 8,407,547 B2 * | 3/2013 | Kim et al. | 714/748 |

(Continued)

*Primary Examiner* — Santiago Garcia
(74) *Attorney, Agent, or Firm* — Joseph Kolodka; Akitaka Kimura

(57) ABSTRACT

A method implemented in a user terminal is disclosed. The method comprises obtaining known precoding matrix P of rank r and modulation and coding scheme assignments used in an original transmission, and a desired retransmission rank r', forming an approximate channel covariance matrix, estimating a minimum mean square error receiver SINR for each layer to be retransmitted responsive to said forming, and finding a retransmission precoding matrix from a preceding codebook that maximizes a sum-rate for enabling precoding selections for retransmissions in uplink multiple-input multiple-output MIMO hybrid automatic repeat request HARQ. Other methods, apparatuses, and systems also are disclosed.

6 Claims, 1 Drawing Sheet

(56) References Cited

U.S. PATENT DOCUMENTS

| | | | |
|---|---|---|---|
| 2005/0027519 A1* | 2/2005 | Li et al. | 704/226 |
| 2008/0188190 A1* | 8/2008 | Prasad et al. | 455/114.3 |
| 2009/0307558 A1* | 12/2009 | Lee et al. | 714/749 |
| 2010/0131813 A1* | 5/2010 | Kim et al. | 714/748 |
| 2010/0195594 A1* | 8/2010 | Seo et al. | 370/329 |
| 2011/0305134 A1* | 12/2011 | Chung et al. | 370/216 |
| 2012/0114030 A1* | 5/2012 | Yue et al. | 375/227 |
| 2012/0177097 A1* | 7/2012 | Lee et al. | 375/227 |

\* cited by examiner

PRECODING SELECTION FOR RETRANSMISSION IN UPLINK MIMO HYBRID ARQ

This application is a divisional of co-pending U.S. patent application Ser. No. 13/252,650, entitled "PRECODING SELECTION FOR RETRANSMISSION IN UPLINK MIMO HYBRID ARQ", filed Oct. 4, 2011, which in turn claims the benefit of U.S. Provisional Application No. 61/389,461, entitled, "Precoding Selection for Retransmissions in Uplink MIMO Hybrid ARQ", filed Oct. 4, 2010, the contents of all of which are incorporated herein by reference.

BACKGROUND OF THE INVENTION

The present invention relates generally to broadband and wireless communications and more particularly to precoding selections for retransmissions in uplink multiple-input multiple-output MIMO Hybrid automatic repeat request HARQ.

Uplink (UL) multiple-input multiple-output (MIMO) with linear precoding has been considered as one important feature for the enhancement of UL transmission in new LTE-Advanced (LTE-A) standard for the fourth generation (4G) cellular systems. The feasibility studies for UL precoding in single user MIMO have shown that an approximately 3 dB gain can be achieved by the precoding over the no precoding transmission for a codebook size of 16. After extensive discussions, the precoding codebook for the UL MIMO has been finalized in for up-to-four transmit antennas.

On the other hand, synchronous non-adaptive hybrid ARQ (HARQ) is still the basic principle for LTE-A UL transmissions, which is the same as that in the LTE systems. In the synchronous non-adaptive HARQ, the retransmission is scheduled in the fixed time instance and the fixed resource block with the same modulation and coding scheme (MCS) as that of the original transmission. The adaptive retransmission is only used as a complement to non-adaptive HARQ to avoid fragmenting the uplink frequency resource or to avoid collisions with random-access resources. The physical hybrid ARQ indicator channel (PHICH) carries the acknowledgement (ACK or NACK) and is transmitted from the base station to the user equipment (UE). Without additional information, the synchronous non-adaptive UL retransmission is operated by default. When adaptive retransmission is scheduled, the resource block and MCS information are delivered to the users through the physical downlink control channel (PDCCH) for the uplink retransmissions.

Since, in LTE systems, the uplink MIMO is not supported, only one codeword is transmitted for each time interval. Thus, the problem regarding the multi-codeword MIMO in hybrid ARQ as that for the DL the hybrid ARQ does not exist. However, this is not the case in LTE-A systems when the uplink MIMO is introduced. Therefore, non-adaptive UL retransmission triggered by PHICH in LTE should be extended to multi-codeword transmission in LTE-A UL. For multi-codeword transmission in uplink MIMO, when the number of codewords in the retransmissions is different from previous retransmissions, how to assign the precoding for the retransmissions is a problem. Here we assume that at most two codewords are allowed for transmission across multiple layers in UL MIMO. Based on the latest discussions in 3GPP meetings, when the number of codewords in the retransmissions is same as previous retransmissions, the rank and precoding vector stay the same, and the retransmission does not carry any automatic power adjustment command.

Several schemes have been proposed for the precoder selections for non-adaptive HARQ in UL MIMO: 1) User terminal selects whatever the precoder wants; the basestation can still decode since the demodulation reference signal (DMRS) is precoded; 2) Use of subset of columns of a precoding matrix with the one corresponding to larger Modulation and coding scheme (MCS); 3) Use of predefined precoding matrix (fixed or cycle) among a set of precoding matrix; 4) a single antenna transmission mode; 5) Using the same precoding matrix as that in the original transmission and occupying all layers; and 6) Precoding column compression with a merger of the columns.

However, none of the aforementioned techniques address the problem of precoding selections at the user terminal for retransmitting one or multiple codewords in non-adaptive hybrid ARQ for uplink (UL) MIMO when the transmission rank or number of codewords in the retransmissions is smaller than the corresponding value in the original transmission. Particularly, the problem framework considers that only imperfect channel state information (CSI), e.g., quantized channel information, is available at the user terminal. Accordingly, there is a need for precoding selection for retransmission in uplink hybrid ARQ that solves this problem.

BRIEF SUMMARY OF THE INVENTION

The invention is directed to a method that includes obtaining a precoder for retransmission of one codeword responsive to a known precoding matrix of a certain rank and modulation and coding scheme assignments used in an original transmission, and a desired retransmission rank', forming an approximate channel covariance matrix; estimating an a minimum mean square error receiver signal-to-noise-interference-ratio for each layer to be retransmitted responsive to the prior forming; and finding a precoding matrix from a preceding codebook that maximizes a sum-rate for enabling precoding selections for retransmissions in uplink multiple-input multiple-output MIMO hybrid automatic repeat request HARQ.

In an exemplary embodiment of precoding selection for Physical Hybrid ARQ Indicator channel PHICH triggered non-adaptive HARQ in UL MIMO, the method includes obtaining a precoder for retransmission of one codeword responsive to known precoding matrix P of rank r in an agreed uplink codebook in and LTE-A standard and modulation and coding scheme assignments used in an original transmission, and a desired retransmission rank r'; for precoding selection for transmit antennas $n_T 2$, desired retransmission rank r'=1, determining a receiver SINR for a given precoder; and obtaining a precoding selection for transmit antennas $n_T=4$ and a transmission rank r and desired retransmission rank r' combination responsive to at least one of maximizing determination of $$g^\dagger \hat{R} g$$

and lookup information in an uplink UL codebook in said LTE-A.

These and other advantages of the invention will be apparent to those of ordinary skill in the art by reference to the following detailed description and the accompanying drawings.

DETAILED DESCRIPTION

The present invention is directed to the problem of precoding selections at the user terminal for retransmitting one or multiple codewords in non-adaptive hybrid ARQ for uplink (UL) MIMO when the transmission rank or number of codewords in the retransmissions is smaller than the corresponding value in the original transmission. Particularly, this problem analysis considers that only imperfect channel state information (CSI), e.g., quantized channel information, is available at the user terminal.

Figure 1:
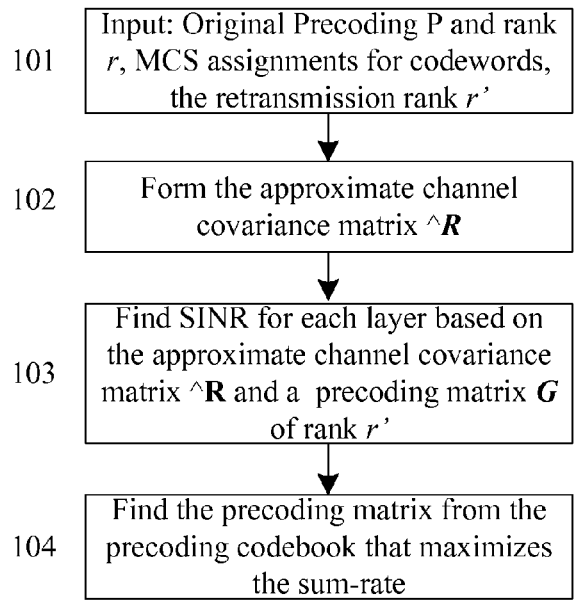
FIG. 1 is a block diagram of precoding selection in non-adaptive hybrid automatic repeat request HARQ in uplink UL MIMO, in accordance with the invention.

The block diagram of FIG. 1 shows the inventive precoding selection for non-adaptive HARQ retransmission for UL MIMO with imperfect/partial channel information. Initially, 101, the user terminal knows the precoding matrix P of rank r and the MCS assignments used in original transmission, as well as the desired retransmission rank r'. Based on these inputs we obtain the precoder for the retransmission of one codeword.

Following the input step 101, the method 102 forms an approximate channel covariance matrix $\hat{R}$, given by $R \triangleq H^\dagger H \approx PDP^\dagger \triangleq \hat{R}$, where $$D = \text{diag}\{\lambda_1, \ldots, \lambda_r\},$$

and complex matrix H is the UL uplink channel. To obtain $\{\lambda_j\}$, we use the MCS information of each codeword assigned by base station. The MCS to a codeword is assigned based on the estimated effective SINR at eNodeB for the whole codeword, i.e., the largest MCS level that can achieve a block error rate (BLER) smaller than 10% for a given effective SINR. Thus, according to the empirical BLER curves of turbo coded modulation for all MCS levels in the standard, given the MCS assignments in the original transmission, we can find the signal-to-noise ratio (SNR) threshold at 10% BLER for such MCSs and use them as the $\{\lambda_j\}$ for all the layers mapped to this codeword. For example, the SNR thresholds for the MCS level 8 (QPSK, code rate Rc=0.5137) and level 16 (16 QAM, Rc=0.6016) are 1.2676 dB and 8.1354 dB, respectively. If these two MCS levels are assigned to a rank-2 precoding, we then obtain the corresponding absolute values of $\{\lambda_j\}$ given by 1.3389 and 6.5094, respectively. From the layer-codeword mapping rules, we then have D=diag{1.3389, 6.5094} for r=2 and D=diag{1.3389, 1.3389, 6.5094, 6.5094} for r=4.

After the preceding formation of the covariance matrix 102, for a precoding matrix G, 103, the method then estimates a minimum mean square error MMSE receiver SINR for each layer to be retransmitted, given by $$\text{SINR}'_i(G) = \frac{\Xi_{i,i}}{1 - \Xi_{i,i}} \approx \frac{\alpha_i}{1 - \alpha_i}$$

where $$\alpha_i = \left[(I + G^\dagger \hat{R} G)^{-1} G^\dagger \hat{R} G\right]_{ii}, \text{ and}$$

$$\Xi \approx (I + G^\dagger \hat{R} G)^{-1} G^\dagger \hat{R} G.$$

Lastly, the precoding matrix G is found 104 from the precoding codebook that maximizes the sum-rate i.e.

$$G' = \arg_{G \in \mathbb{C}^{n_T \times r'}}^{\max} \sum_{i=1}^{r'} \log_2(1 + \text{SINR}'_i(G)),$$

where $$\mathbb{C}^{n_T \times r}$$

is the complex matrix space of dimensions $n_T \times r$ and $$\text{SINR}'_i(G)$$

is the signal-to-interference-plus-noise ratio (SINR) for the ith layer at the receiver.

Specifically, for retransmission rank r'=1, we have $$g' = \arg_{g \in \mathbb{C}^{n_T \times r}}^{\max} g^\dagger H^\dagger H g,$$

where $$\mathbb{C}^{n_T \times r'}$$

is a finite set, and G' is obtained by searching from all elements in the set.

Figure 2:
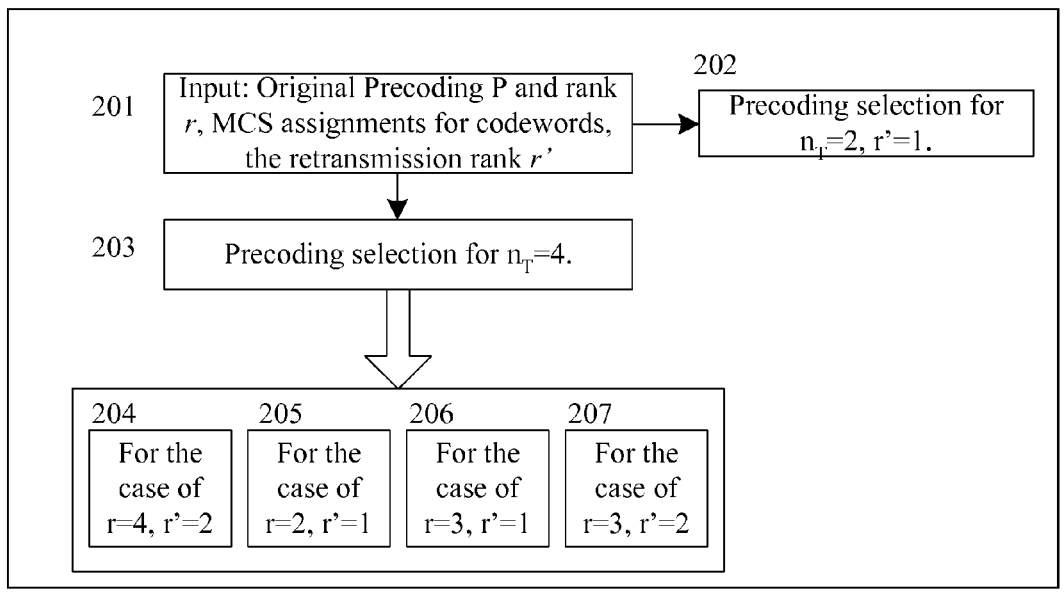
FIG. 2 is a block diagram of the inventive precoding selection for Physical Hybrid ARQ Indicator channel PHICH triggered non-adaptive HARQ in UL MIMO, in accordance with the invention.

The block diagram of FIG. 2 shows the inventive precoding selection for PHICH triggered non-adaptive hybrid HARQ in UL MIMO.

Initially with the invention, 201, the user terminal knows the precoding matrix P of rank r in the agreed UL codebook in LTE-A and the MCS assignments used in original transmission, as well as the desired retransmission rank r'. Based on these inputs we obtain the precoder for the retransmission of one codeword.

Then under the inventive method, 202, with a precoding selection for $n_T=2$, r'=1 occurs, we obtain the receiver SINR for a given precoder according to the relationship $$\text{SINR}'(g') = \lambda_1 |g'_1|^2 + \lambda_2 |g'_2|^2$$

where the precoding vector for retransmitting one codeword is $$g' = [g'_1, g'_2]^T.$$

From the layer-1 UL codebook in LTE-A for $n_T=2$ in Table 1, the first four vectors offer the same SINR, but the last two which utilize only one transmit antenna results in a smaller SINR. Therefore, the precoding vector for retransmission can be chosen as any one of the first four precoding vectors in Table 1 of the UL codebook, e.g. the first precoder (of index 0) in Table 1. Since the original precoding vector is an identity matrix which does not align to any channel matrix, for the retransmission with a lower rank r'<r, the better choice is cycling of the precoders among the first four precoding vectors in Table 1.

Then the method obtains the precoding selection for $n_T=4$ case by case 203.

For the case 204 of a precoding selection for $n_T=4$, r=4, r'=2: the method obtains the per layer SINR from linear MMSE receiver, given by $$SINR'_i(G') = \frac{\Xi_{i,i}}{1-\Xi_{i,i}},$$

where $$\Xi' = (I + G'^\dagger DG')^{-1} G'^\dagger DG'.$$

The sum-rate can thus be obtained by $$\sum_{i=1}^{r'} \log_2(1 + SINR'_i(G')).$$

Then, based on tables in the

UL codebook in LTE-A, we obtain the following selection rule: For $n_T=4$, when the latest transmission is full rank, i.e., r=4, the precoding vector for a retransmission with rank r'=2 can be fixed to be any one of the eight precoding vectors of index 8 to 15 in the 2-layer procoding codebook in Table 3 of the UL codebook in LTE-A, or cycling in time of the eight precoding vectors of index 8 to 15 in the 2-layer codebook in Table 3 of the UL codebook in LTE-A in any fixed order. Precoding selection for $n_T=4$, r=1': the selected precoder should maximize $$g^\dagger \hat{R} g = \sum_{i=1}^{r'} \lambda_i |g^\dagger p_i|^2,$$

where $p_t$ denotes the tth column of P.

For the specific case 206 for r=3: the selected precoder should maximize $$g^\dagger \hat{R} g = \lambda_1 |g^\dagger p_1|^2 + \frac{\lambda_2}{4} + \frac{\lambda_3}{4}.$$

We then obtain the optimal precoder indices given in Table 8 of the UL codebook in LTE-A. Since the solution for each P is not unique, we select the one with the lowest index presented in Table 7 of the UL codebook in LTE-A.

For the precoding selection case 205 for $n_T=4$, r=2, r'=1: the selected precoder should maximize $$g^\dagger \hat{R} g = \lambda_1 |g^\dagger p_1|^2 + \lambda_2 |g^\dagger p_2|^2$$

or equivalently, $$g^\dagger \hat{R} g = \lambda_1 (|g^\dagger p_1|^2 + |g^\dagger p_2|^2) + (\lambda_2 - \lambda_1)|g^\dagger p_2|^2$$

or $$= \lambda_2 (|g^\dagger p_1|^2 + |g^\dagger p_2|^2) + (\lambda_1 - \lambda_2)|g^\dagger p_1|^2.$$

Note that the optimal precoding selection only depends on the order of $\lambda_j$ or the order of MCS assignment in the original transmission. The results are provided in Table 9 of the UL codebook in LTE-A. We can see that for each rank-2 precoder in the original transmission, we have 4 or 2 choices for the retransmission that result in the same rate. For the r=2 precoders of index 8 to 15, the results of optimal retransmission precoding indices are same for two different orders of $\lambda_1$ and $\lambda_2$ meaning that the resulting precoding selection is solely based on the original precoder. Since the results are not unique, we use the one with the lowest index which is summarized in Table 7 of the UL codebook in LTE-A.

For the precoding selection case 207 for $n_T=4$, r=3, r'=2: The precoding vector for the retransmission with rank r'=2 can be chosen from Table 3 of the UL codebook in LTE-A, with the indices provided in Table 7 of the UL codebook in LTE-A based on the assigned MCSs, or a threshold for MCS1-MCS2, and precoding vectors in the original transmission.

In a simplified version, for $n_T=4$, if we only define one generalized precoder for each retransmission rank r', based on the results shown in Table 6-8 of the UL codebook in LTE-A and the results for (r=4,r'=2), we can choose the precoder index selected in more cases than others. For example, the precoder with index 8 in a r'-layer codebook for retransmission rank r'.

Note that the precoding index is referring to the latest agreement on uplink precoding codebook defined in TR36.814 v9.0.0 in LTE-A standardizations.

From the foregoing it can be seen that the present invention provides a general precoding selection scheme for non-adaptive HARQ for UL MIMO with practical system constraints. The inventive precoding selection method provides the better system performance for non-adaptive HARQ in UL MIMO over the prior art by imposing the approximation of the channel covariance based on the limited or imperfect channel information available at user terminal. The inventive method obtain the precoding selection for different transmit antenna settings and different ranks in the original transmission. For most cases, the optimal precoding selection only depend on the precoder and the order of the MCSs used in the original transmission or the latest transmission thus can be as simple as the prior art.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented in a user terminal, the method comprising:
   obtaining known precoding matrix P of rank r and modulation and coding scheme assignments used in an original transmission, and a desired retransmission rank r';
   forming an approximate channel covariance matrix;
   estimating a minimum mean square error receiver SINR for each layer to be retransmitted responsive to said forming; and
   finding a retransmission precoding matrix from a preceding codebook that maximizes a sum-rate for enabling precoding selections for retransmissions in uplink multiple-input multiple-output MIMO hybrid automatic repeat request HARQ, wherein said estimated minimum mean square error receiver SINR for each layer $SINR'_i$ comprises $$SINR'_i(G') = \frac{\Xi_{i,i}}{1-\Xi_{i,i}} \approx \frac{\alpha_i}{1-\alpha_i}$$

where G is a precoding matrix of rank r, $$\alpha_i = [(I + G^\dagger \hat{R} G)^{-1} G^\dagger \hat{R} G]_{i,i}, \Xi \approx (I + G^\dagger \hat{R} G)^{-1} G^\dagger \hat{R} G,$$

and I is an identity matrix.

2. The method of claim 1, wherein said retransmission precoding matrix G' from a preceding codebook comprises $$G' = \arg\max_{G \in \mathcal{G}^{n_T \times r'}} \sum_{i=1}^{r'} \log_2(1 + SINR'_i(G)),$$

where $$g^{n_T \times r}$$

is a complex matrix space of dimensions $$n_T \times r, SINR'_i(G')$$

is me signal-to-interference-plus-noise ratio (SINR) for the ith layer at a receiver, and G is a precoding matrix.

3. The method of claim 2, wherein for a retransmission rank r'=1, said retransmission precoding matrix G'=g' comprises $$g' = \arg\max_{q \in \mathcal{G}^{n_T \times 1}} g^\dagger H^\dagger H g,$$

where $$g^{n_T \times r'}$$

is a finite set, and G' is obtained by searching from all elements in the set.

4. A method implemented in a user terminal, the method comprising:
obtaining known precoding matrix P of rank r in an uplink (UL) codebook in Long Term Evolution Advanced (LTE-A) standards and modulation and coding scheme assignments used in an original transmission, and a desired retransmission rank r';
for precoding selection for transmit antennas $n_T$=2 and desired retransmission rank r'=1, determining a receiver SINR for a given precoder; and
obtaining a precoding selection for transmit antennas $n_T$=4 and a transmission rank r and desired retransmission rank r' combination responsive to at least one of maximizing determination of $$g^\dagger \hat{R} g$$

and lookup information in the UL codebook in said LTE-A standards,
wherein for said transmit antennas $n_T$=4 and a transmission rank r and desired retransmission rank r' combination of r=3 and r'=1, said precoding selection for maximizing $$g^\dagger \hat{R} g = g^\dagger \hat{R} g = \lambda_1 |g^\dagger p_1|^2 + \zeta(\lambda_2 - \lambda_3),$$

where $p_1$ denotes the 1st column of known precoding matrix P, $\hat{R}$ denotes an approximate channel covariance matrix, $\lambda_t$ denotes an indices of pairing.

5. The method of claim 4, wherein for said transmit antennas $n_T$=4 and a transmission rank r and desired retransmission rank r' combination of r=2 and r'=1, said precoding selection for maximizing $$g^\dagger \hat{R} g = g^\dagger \hat{R} g = \lambda_1 |g^\dagger p_1|^2 + \lambda_2 |g^\dagger p_2|^2,$$

where $p_1$ denotes the 1st column of known precoding matrix P, $\hat{R}$ denotes an approximate channel covariance matrix, $\lambda_t$ denotes an indices of pairing.

6. The method of claim 4, wherein when said precoding selection is not unique, said obtaining uses said precoding selection with the lowest index of the corresponding UL codebook in said LTE-A standards.

* * * * *